(12) United States Patent
Zojer

(10) Patent No.: US 6,888,939 B1
(45) Date of Patent: May 3, 2005

(54) CIRCUIT FOR JOINT TRANSMITTING VOICE AND DATA OVER A TELEPHONE LINE

(75) Inventor: Bernhard Zojer, Villach (AT)

(73) Assignee: Infineon Technologies, AG, Munich (DE)

(*) Notice: Subject to any disclaimer, the term of this patent is extended or adjusted under 35 U.S.C. 154(b) by 0 days.

(21) Appl. No.: 09/914,147

(22) PCT Filed: Feb. 1, 2000

(86) PCT No.: PCT/DE00/00277

§ 371 (c)(1),
(2), (4) Date: Aug. 22, 2001

(87) PCT Pub. No.: WO00/51258

PCT Pub. Date: Aug. 31, 2000

(30) Foreign Application Priority Data

Feb. 25, 1999 (DE) .......................................... 199 08 187

(51) Int. Cl.⁷ ........................... H04M 1/00; H04M 11/00
(52) U.S. Cl. ........................... 379/399.01; 379/399.02; 379/402; 379/413.01; 379/413.02; 379/413.03; 379/413.04; 379/90.01; 379/93.01; 379/93.05; 379/93.09
(58) Field of Search .................. 379/399.01–413.04, 379/90.01–108.02

(56) References Cited

U.S. PATENT DOCUMENTS 5,841,841 A    11/1998   Dodds et al. ............ 379/93.08
6,172,992 B1    1/2001   Hoffman ................. 370/516

FOREIGN PATENT DOCUMENTS

DE       196 50 833 C1    3/1998
EP       0 691 753 A1     1/1996

OTHER PUBLICATIONS

English Translation of PCT International Preliminary Examination Report, dated Mar. 14, 2001, 5 pgs.

Primary Examiner—Forester W. Isen
Assistant Examiner—Ramnandan Singh
(74) Attorney, Agent, or Firm—Edwards & Angell, LLP; Peter F. Corless; George W. Hartnell, III

(57) ABSTRACT

The invention relates to an SLIC circuit (1), which is connected directly to a telephone line (2), for joint transmission of voice and data via the telephone line (2), with adequate echo attenuation achieved even at high data frequencies in that a first current which corresponds to the sum of the transmission and received currents (Ia, Ib), and a second current (Id) which corresponds to the current produced by the transmission power level (Vtx) at the data frequency, are produced, and the difference between the first current and the second current (Id) is emitted.

10 Claims, 1 Drawing Sheet

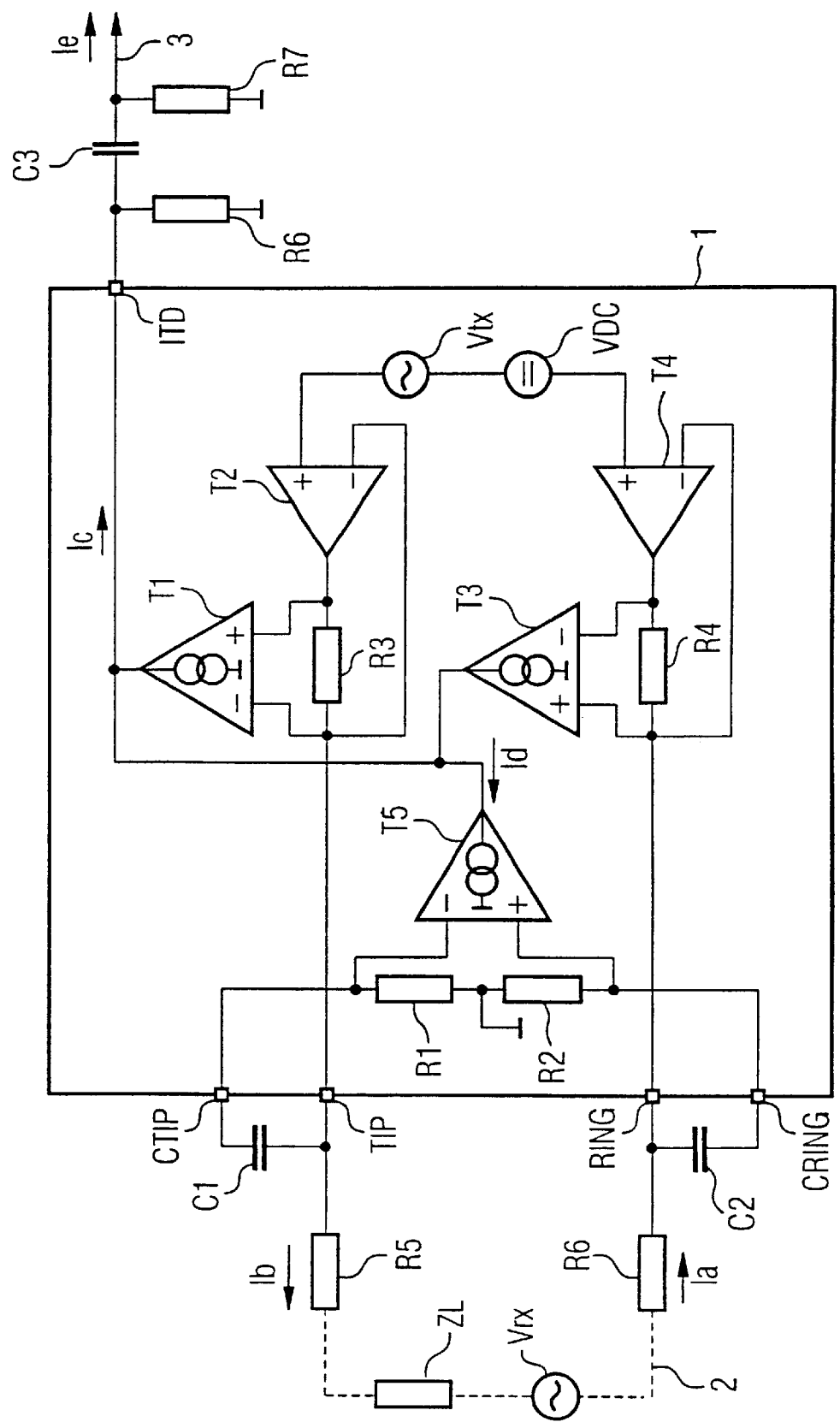

CIRCUIT FOR JOINT TRANSMITTING VOICE AND DATA OVER A TELEPHONE LINE

The present invention relates to a circuit for joint transmission of voice and data via a telephone line. In particular, the present invention relates to a circuit which allows an electronic hardware solution, without transformers and without relays, for joint transmission of a voice and broadband data signals in accordance with xDSL Standards.

In systems in which both voice and data are transmitted via one telephone line, voice and data signals exist at the same time in both transmission directions on the telephone line. The directions are separated by subtraction of the transmitted signal from the received signal: To do this, the impedance of the telephone line needs to be modelled. The echo attenuation achieved in this way essentially governs the data rate that can be achieved.

Typical broadband data systems operate with transformers, while electronic solutions without transformers are normal in analog voice systems and used or are referred to as subscriber line interface circuits (SLIC) as the interface to the telephone line. These are generally based on the principle of "transmit voltage, receive current" (V/I) or "transmit current, receive voltage" (I/V). The DC supply, which is required in analog systems, for the subscriber is also provided via these SLICs, so that the SLICs need to be suitable for high voltages (up to 150V). In order to combine the two systems, complete conventional data and voice systems could be used, with the transformers and SLICs being connected to the telephone line via a frequency splitter (POTS splitter). Echo suppression is then carried out separately for voice and data frequencies upstream of the transformer and (seen in the direction of the telephone line) upstream of the SLIC circuit.

A system without any transformers has to transmit voice, data, the DC supply and, possibly, ring signals via a broadband high-voltage SLIC circuit. For direction separation by echo suppression, signal corruption in the voice frequency band caused by the SLIC circuit can be ignored. For high-frequency data transmission, on the other hand, the signal corruption caused by nonlinearities in the SLIC circuit must be taken into account since, owing to the high attenuation on the telephone line, very major level differences could occur between the transmitted signal and the received signal, so that the SLIC distortion, which is not compensated for or eliminated, would have a negative influence on the signal-to-noise ratio and on the data rate.

The present invention is thus based on the object of providing a circuit without transformers for joint transmission of voice and data via a telephone line, with improved echo attenuation being achieved so that a higher data rate can be transmitted.

This object is achieved by a circuit having the features of claim 1. The dependent claims describe preferred and advantageous embodiments of the present invention which themselves contribute in particular to a simple circuitry implementation.

The circuit according to the invention is designed in the form of an SLIC circuit which is connected directly to the corresponding telephone line, with adequate echo attenuation being achieved in that a first current, which corresponds to the sum of transmission and received currents which flow via the telephone line and are produced by a transmission power level and a received power level, respectively, and a second current, which corresponds to the current produced by the transmission power at the data frequency, are produced, and the difference between the first current and the second current is emitted via a data connection of the SLIC circuit, with this difference possibly still including direct currents and voice currents in addition to the data currents produced by the received power level.

The first current can be produced by a first circuit comprising drivers and voltage/current amplifiers, while the second current can be produced by the combination of high-pass filters with an amplifier.

The data output of the SLIC circuit can be connected to a further high-pass filter which ensures that any direct current or voice currents which may be contained in the signal passing via the data connection are filtered out.

The present invention for the first time provides an echo attenuation loop for an integrated (high-voltage) SLIC circuit which is connected directly to the telephone line, with the SLIC circuit operating, in particular, on the V/I principle.

Furthermore, the present invention for the signal which is passed via the data line to contain, approximately, solely the data currents caused by the received power level, in particular with nonlinear distortion, caused by the SLIC circuit in this signal also being suppressed.

The present invention will be described in greater detail in the following text with reference to a preferred exemplary embodiment, which is illustrated in the single FIGURE.

The SLIC circuit 1 shown in FIG. 1 is a V/I SLIC circuit which is connected directly via telephone line connections TIP and RING to a telephone line 2 (ADSL line) via which voice and data are transmitted jointly.

In FIG. 1, ZL denotes the line impedance of the telephone line 2 while Vrx and Vtx symbolize equivalent voltage sources, with Vrx being based on the received power level supplied via an appropriate connection, and Vtx being based on the transmission power level of SLIC circuit 1. The telephone line 2 is via terminating resistors R5 and R6 to the respective telephone line connections TIP and RING. The terminating resistors R5 and R6 are used for line matching. At normal data frequencies, the line impedance is approximately constant at 100 Ω, so that the terminating resistors R5 and R6 are each chosen to be 50 Ω.

SLIC circuit 1 essentially comprises two circuit sections.

The first circuit section 1 contains a symmetrical arrangement of line drivers T2, T4, transconductance or voltage/current amplifiers T1, T3 and (preferably identical) resistors R3, R4, which are connected as shown in FIG. 1. The line drivers T2 and T4 receive the transmission power level symbolized by Vtx and send this, together with a DC voltage component which is symbolized by VDC, via a low impedance to the telephone line 2. The transconductance amplifiers T1 and T3 measure the currents flowing through the resistors R3 and R4, respectively, by tapping off the voltage dropped across each of these resistors. The transconductance amplifiers T1 and T3 preferably scale the respective mea sured value by a specific factor which, for example, may be 100, thus giving the following gain factor $g_m$ for the amplifiers T1 and T3:

$$g_m=1/(100*R3)=1/(100*R4)$$

The currents emitted from the transconductance amplifiers T1 and T3 are added in the correct phase and are supplied to a data current output, or the current output assigned to data, ITD in the SLIC circuit 1. The sum current supplied in this way is a measure of the transverse line current, that is to say the line current flowing via the load, which comprises the superimposition of all the currents (direct current, voice and data) in the transmission and reception directions, that is to say, assuming the already mentioned values for R5 and R6, respectively, and the scaling factor of the transconductance amplifiers T1 and T3:

$$Ic=(Ia+Ib)/100=[IDC+(Vtx+Vrx)/(100+ZL)]/50$$

In this case, Ia and Ib denote the data and voice currents flowing via the telephone line 2 and the respective telephone line connections TIP and RING in the transmission and reception direction, Ic denotes the (assuming that the function of the further amplifier T5 shown in FIG. 1 is ignored) sum current emitted by the two transconductance amplifiers T1 and T3, and IDC denotes the DC component corresponding to the DC voltage component VDC.

The second major circuit section comprises the capacitors C1, C2, the resistors R1 and R2 and the further current/voltage amplifier T5 shown in FIG. 1. The components R1 and C1, together with R2 and C2, each form a high-pass filter, so that the inputs of the amplifier T5 are each coupled via one of the high-pass filters to the respective telephone line connections TIP and RING. The already mentioned high-pass filters are designed such that the high-pass filtering between the additional connections CTIP and CRING shown in FIG. 1 means that only the data current components are still present, while both voice and data current components are present between the connections TIP and RING. The amplifier T5 measures the (data) voltage that is present between these connections CTIP and CRING, and produces a corresponding output current Id.

The second circuit section described above has the function of once again subtracting the current produced by the transmission power level in the data frequency band from the sum current of the two transconductance amplifiers T1 and T2. This current produced by Vtx must therefore correspond, in terms of magnitude and direction, to the output current Id shown in FIG. 1.

Since, as has already been mentioned above, the line impedance ZL of the telephone line 2 is approximately constant at 100 Ω in the data frequency band, the components in the second circuit section must be designed such that, assuming the above values for R5 and R6 and the scaling factor of the transconductance amplifiers T1, T2:

$$Id=Vtx_{data}/(50*(100+ZL))$$

In this case $Vtx_{data}$ denotes the data transmission power level.

Thus, for the value ZL≈100 Ω which is approximately constant in the data frequency band:

$$Id \approx Vtx_{data}/10\ k\Omega$$

The signal Ic supplied to the data output ITD is thus calculated taking account of the function of the previously mentioned second circuit section, as follows:

$$Ic=(Ia+Ib)/100-Id \approx (Ia+Ib)/100-Vtx_{data}/10\ k\Omega$$

The signal Ic supplied to the data output ITD thus, to a first approximation, contains only the data currents produced by the received power level in addition to any direct currents and voice currents which may be present, in particular with the nonlinear distortion produced by the high-voltage SLIC circuit 1 being suppressed.

A further improvement can be achieved by connecting the data current output ITD to a high-pass filter having the components R6, C3 and R7 shown in FIG. 1 which is used to separate or filter out the direct currents and voice currents described above which may still be contained in the output signal Ic. Only the data current produced by the received power level symbolized by Vrx is then transmitted via the data line 3.

The present invention thus for the first time provides a (broadband) SLIC circuit which is connected directly to the telephone line 2 and in which efficient echo attenuation is provided even at high data rates.

List of Reference Symbols
1 SLIC circuit
2 Telephone line
3 Data current line
R1–R6 Resistors
C1–C3 Capacitors
T1–T5 Amplifiers
ZL Line impedance
Vrx Equivalent voltage source for the received power level
Vtx Equivalent voltage source for the transmission power level
VDC DC voltage component
Ia–Ie Currents

What is claimed is:
1. A circuit (1) for joint transmission of voice and data via a telephone line (2),
having a first and a second telephone line connection (TIP, RING) for connection to the telephone line (2),
having a data connection (ITD) for connection to a data line (3),
having first circuit means (T1–T4, R3, R4), which are coupled to the telephone line connections (TIP, RING) for producing a first current which is composed of the sum of transmission and received currents (Ia, Ib) which flow via the telephone line (2) and are produced via a transmission power level (Vtx) and a received power level (Vrx), respectively, and
having second circuit means (T5, R1–2, C1–C2) which are coupled to the telephone line connections (TIP, RING) for producing a second current (Id) which corresponds to the current produced solely by the transmission power level corresponding to the data,
with the outputs of the first circuit means (T1–T4, R3, R4) and of the second circuit means (T5, R1–R2, C1–C2)

being coupled to the data connection (ITD) in such a manner that a current (Ic) which is emitted via the data connection (ITD) corresponds to the difference between the first current and the second current (Id).

2. The circuit as claimed in claim 1, characterized in that the first circuit means comprise a symmetrical arrangement of first and second drivers (T2, T4) and first and second amplifiers (T1, T3), with the first and second drivers (T2, T4) each receiving the transmission power level (Vtx) at one of their inputs and being connected by their other input via a first and second resistor (R3, R4), respectively, to their output, and with the first and second amplifiers (T1, T3) amplifying the voltage drop across the first and second resistors (R3, R4), respectively.

3. The circuit as claimed in claim 2, characterized in that the first and second amplifiers (T1, T3) are each voltage/current amplifiers.

4. The circuit as claimed in claim 3, characterized in that the first resistor (R3) is connected between a negative input and a positive input of the first amplifier (T1), with the negative input of the first amplifier (T1) being connected to the first telephone line connection (TIP), and in that the second resistor (R4) is connected between a positive input and a negative input of the second amplifier (T3), with the positive input of the second amplifier (T3) being connected to the second telephone line connection (RING).

5. The circuit as claimed in claim 2, characterized in that the first and second drivers (T2, T4) are differential amplifiers, with the positive input, each receiving the transmission power level (Vtx), while the negative input is in each case connected via the corresponding resistor (R3, R4) to the corresponding output of the driver (T2, T4).

6. The circuit as claimed in claim 1 and claim 2, characterized in that the output of the amplifier (T5) in the second circuit means is connected to the outputs of the first and second amplifiers (T1, T3) in the first circuit means and to the data connection (ITD).

7. The circuit as claimed in claim 1, characterized in that the second circuit means comprise an amplifier (T5) whose inputs are connected via respective high-pass filters (R1, C1; R2, C2) to the telephone line connections (TIP, RING).

8. The circuit as claimed in claim 7, characterized in that the amplifier (T5) in the second circuit means is a voltage/current amplifier, a negative input of this amplifier (T5) being connected via a first high-pass filter (R1, C1) to the first telephone line connection (TIP), and a positive input of this amplifier (T5) being connected via a second high-pass filter (R2, C2) to the second telephone line connection (RING).

9. The circuit as claimed in claim 8, characterized in that the first and second high-pass filters (R1, C1; R2, C2) are designed such that the amplifier (T5) in the second circuit means are supplied only with data current components of the currents (Ia, Ib) flowing in the transmission direction via the telephone line.

10. The circuit as claimed in claim 1, characterized in that the data connection (ITD) is coupled to a high-pass filter (R6, R7, C3) via which the current signal (Ic) which is emitted via the data connection (ITD) is passed, the high-pass filter (R6, R7, C3) being designed such that DC components and/or voice current components are filtered out of the current signal (Ic).

* * * * *